United States Patent [19]
Kato et al.

[11] Patent Number: 6,105,058
[45] Date of Patent: Aug. 15, 2000

[54] COMMUNICATION CONTROL METHOD AND APPARATUS

[75] Inventors: Junji Kato; Susumu Nagano, both of Chiba, Japan

[73] Assignee: Sony Corporation, Tokyo, Japan

[21] Appl. No.: 09/027,005

[22] Filed: Feb. 20, 1998

Related U.S. Application Data

[62] Division of application No. 08/421,943, Apr. 13, 1995, Pat. No. 5,742,770.

[30] Foreign Application Priority Data

Apr. 22, 1994 [JP] Japan ................................. 6-107910

[51] Int. Cl.[7] .............................. G06F 3/14; G06F 13/14
[52] U.S. Cl. ............................ 709/217; 345/328; 360/71
[58] Field of Search ....................... 340/825.25, 825.76, 340/825.79, 825.24, 825.08, 825.14, 825.22; 348/460, 734, 473, 906, 467, 445, 461, 807; 711/114; 710/17.6, 15, 18.19; 714/7; 709/21.7; 345/328; 315/367; 360/71

[56] References Cited

U.S. PATENT DOCUMENTS 4,754,204 6/1988 Ando et al. ............................. 348/445
5,204,662 4/1993 Oda et al. .............................. 709/217

Primary Examiner—Daniel H. Pan
Attorney, Agent, or Firm—Frommer Lawrence & Haug, LLP; William S. Frommer; Dennis M. Smid

[57] ABSTRACT

A plurality of terminals are connected to a common data bus. Each terminal is capable of issuing and processing two types of commands: a simultaneous command and a non-simultaneous command. A receiving terminal processes every simultaneous command, but processes only the most recently received non-simultaneous command. The receiving terminal acknowledges the receipt of every received simultaneous command and of every executed non-simultaneous command. The receiving terminal sends a reject signal for every received non-simultaneous signal that was not executed.

14 Claims, 12 Drawing Sheets

COMMUNICATION CONTROL METHOD AND APPARATUS

This application is a Divisional of prior application Ser. No. 08/421,943, filed Apr. 13, 1995, now U.S. Pat. No. 5,742,770.

BACKGROUND OF THE INVENTION

The present invention relates to a communication control method and apparatus for reducing the number of messages exchanged among data processing terminals, such as VTRs, computers, or video displays, for example.

When a plurality of terminals, such as VTRs, are connected to a common data bus, the VTRs exchange commands among each other. In such a network, when a command packet of command data is received by a terminal, the receiving terminal provides a response packet to the transmitting terminal; this response packet informs the transmitting terminal that the receiving terminal has received the command. The terminals in the network generate two types of commands: commands that can be performed simultaneously at any one particular terminal and commands that cannot be performed simultaneously at any one particular terminal. The first type of command is referred to as a simultaneous command, and the second type of command is referred to as a non-simultaneous command. A simultaneous command can be performed alone, or simultaneously with any other command to be performed at that terminal, including a non-simultaneous command. A non-simultaneous command, however, is never performed simultaneously with another non-simultaneous command. A non-simultaneous command is performed at the terminal either alone or simultaneously with a simultaneous command. Examples of simultaneous commands are a counter reset command and an input switching command. Examples of non-simultaneous commands are a reproduction command, a recording command, a fast forward command, and a rewind command.

FIG. 12 shows the implementation of the command communication technique described above. In this case, terminal (A) transmits to terminal (B) a plurality of non-simultaneous commands. Assuming that non-simultaneous command 1 is received first by terminal (B), terminal (B) begins executing non-simultaneous command 1. Terminal (B) also transmits to terminal (A) a busy signal 1, which indicates that terminal (B) is currently processing a command transmitted by terminal (A). If terminal (B) receives a second non-simultaneous command while it is processing non-simultaneous command 1, terminal (B) stops processing non-simultaneous command 1 and issues a reject signal 1, which indicates that terminal (B) has ceased processing non-simultaneous command 1. After transmitting reject signal 1, terminal (B) processes non-simultaneous command 2, and transmits busy signal 2. After terminal (B) has processed non-simultaneous command 2, terminal (B) transmits a complete signal 2 to terminal (A). Reference numeral "2" is used, instead of "1", because this complete signal corresponds to the completion of the second non-simultaneous command received at terminal (B). In this example, six packet signals were generated in order to execute one command.

In the case of FIG. 13, terminal (A) transmits to terminal (B) a non-simultaneous command 1 and a simultaneous command 2. After receiving non-simultaneous command 1 from terminal (A), terminal (B) transmits to terminal (A) a busy signal 1. After receiving simultaneous command 2 during the processing of non-simultaneous command 1, terminal (B) generates busy signal 2. In this situation, the non-simultaneous command 1 and simultaneous command 2 are performed concurrently. If non-simultaneous command 3 is then transmitted to terminal (B), terminal (B) halts the processing of non-simultaneous command 1 and issues a reject signal 1 to terminal (A). Terminal (B) then processes non-simultaneous command 3 and issues a busy signal 3 to terminal (A). After terminal (B) completes simultaneous command 2 and non-simultaneous command 3, it issues a complete signal 2 and a complete signal 3 to terminal (A). In such a case, nine packets are transmitted and received.

Thus, in the previously proposed system mentioned above, the reception of one command always causes the receiving terminal to issue a response thereto. Consequently, this method of communication results in an increased volume of data on the network.

OBJECTS OF THE INVENTION

It is, therefore, an object of the present invention to provide a network communication control technique that reduces the amount of data exchanged between a command transmitting terminal and a command receiving terminal.

Various other objects, advantages and features of the present invention will become readily apparent from the ensuing detailed description, and the novel features will be particularly pointed out in the appended claims.

SUMMARY OF THE INVENTION

In accordance with this invention, there is provided a communication control technique in which a plurality of terminals are connected to a common data bus. These terminals transmit and receive commands formed as packets, and these commands are categorized either as simultaneous commands or non-simultaneous commands. Every terminal includes a command selection communication control section which causes a receiving terminal to store the most recently received non-simultaneous command and to erase any previously stored non-simultaneous command.

Furthermore, a receiving terminal does not provide to the transmitting terminal an acknowledgement of receipt for every received non-simultaneous command. The receiving terminal provides such a response only with respect to non-simultaneous commands that are executed. With respect to a command that is not executed, a reject signal is issued in order to inform the transmitting terminal that the corresponding command has not been executed. Consequently, the number of packets which are transmitted and received over the network is reduced.

A command execution processing section of the receiving terminal executes the stored non-simultaneous command in the next predetermined period. With respect to received simultaneous commands, a receiving terminal executes such commands either in the same predetermined period in which they are received or in the next predetermined period, and such commands are executed simultaneously with any other commands that are currently being executed in the receiving terminal.

DETAILED DESCRIPTION OF THE PREFERRED EMBODIMENTS

Figure 1:
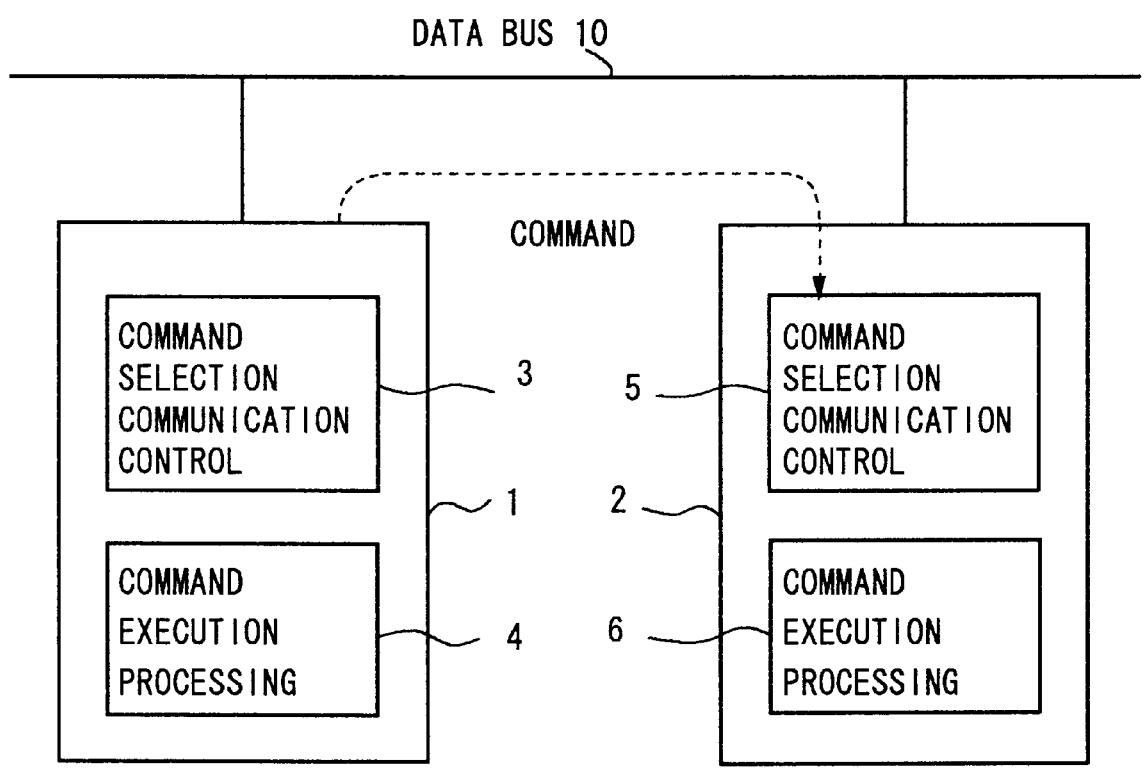
FIG. 1 illustrates a network comprising a bus and a plurality of terminals.

A communication control method according to the invention will now be described hereinbelow with reference to the drawings. FIG. 1 illustrates a network to which is applied the communication control method of the present invention. The network comprises terminal 1, terminal 2, and data bus 10. Other terminals may be added to bus 10 since FIG. 1 merely illustrates an example of the preferred embodiment. These terminals may individually comprise various audio-video devices, such as VTRs, computers, or video displays. Terminal 1 includes a command selection communication control section 3 and a command execution processing section 4. Similarly, terminal 2 also includes a command selection communication control section 5 and a command execution processing section 6. The command selection communication control section 5 of terminal 2 accepts any commands transmitted by terminal 1 over bus 10. In accordance with a method to be described later, the command selection communication control section 5 selects the command to be executed from among the commands received within a predetermined timing period. The predetermined timing period may be arbitrarily set to a particular duration; in this embodiment, the predetermined timing period is 17 ms. The command selection communication control section 5 supplies the selected command to the command execution processing section 6 for execution.

The following discussion describes the method by which terminal 2 executes a command transmitted by terminal 1. When a simultaneous command arrives at terminal 2, terminal 2 sends an acknowledgement signal, busy 1, back to terminal 1 and executes the received command within the same predetermined timing period in which the command was received. Unlike a simultaneous command, a non-simultaneous command transmitted by terminal 1 is first stored in the buffer of terminal 2 within a predetermined period. If the buffer already stores a previously received non-simultaneous command, the newly received non-simultaneous command is written over the previously stored non-simultaneous command. Furthermore, terminal 2 returns to terminal 1 a reject signal corresponding to the erased non-simultaneous command. During the next predetermined timing period, terminal 2 executes the most recently stored non-simultaneous command and simultaneously transmits to terminal 1 a busy signal acknowledging receipt of the executed command. Terminal 2 sends to terminal 1 a complete signal when the command execution is finished. Although this embodiment confers the highest priority to the most recently received non-simultaneous command, the present invention also provides for terminals that give the highest priority to the earliest received non-simultaneous command. In such a case, the receiving terminals would not store a new non-simultaneous command until the presently stored command had been fully executed. Furthermore, the present invention also provides terminals that execute all received non-simultaneous commands according to a predetermined order.

Figure 2:
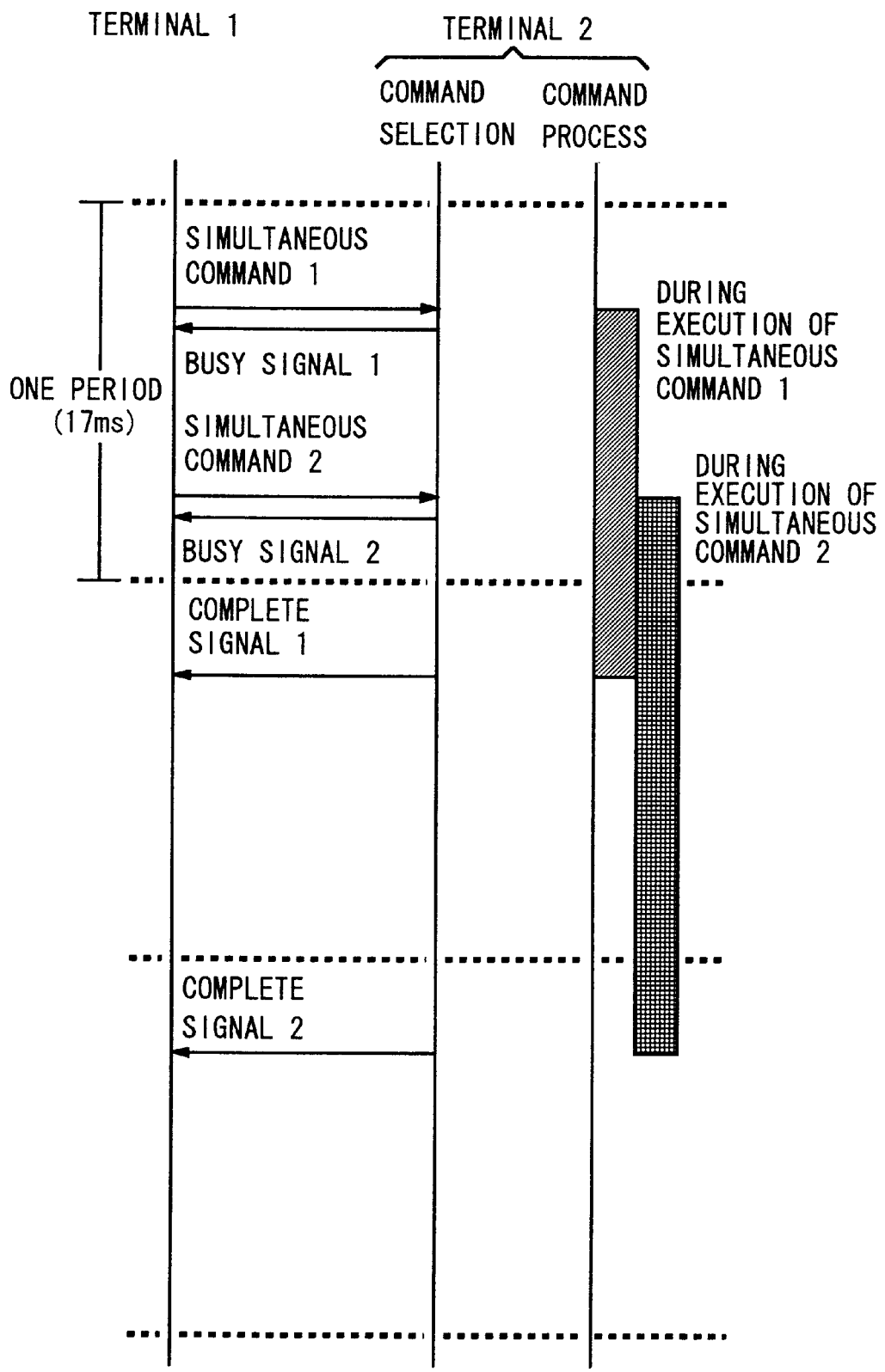
FIG. 2 schematically illustrates command communication in which two simultaneous commands are received in the same predetermined period.

FIG. 2 shows the operation where two simultaneous commands are received by terminal 2 within a predetermined period. In period 1, terminal 2 receives simultaneous command 1, transmits busy signal 1, and begins executing the simultaneous command 1. Terminal 2 also receives simultaneous command 2 during period 1 and, as in the case of simultaneous command 1, terminal 2 transmits busy signal 2 and begins executing simultaneous command 2. Thus, the respective periods of execution of these commands may overlap one another to some extent, as indicated. Furthermore, the respective periods of execution of these commands are independent of the predetermined period of the command selection communication control section of each terminal. During period 2, terminal 2 transmits complete signal 1 after the execution of simultaneous command 1 is completed. During period 3, terminal 2 transmits complete signal 2 after the execution of simultaneous command 2 is completed.

Figure 3:
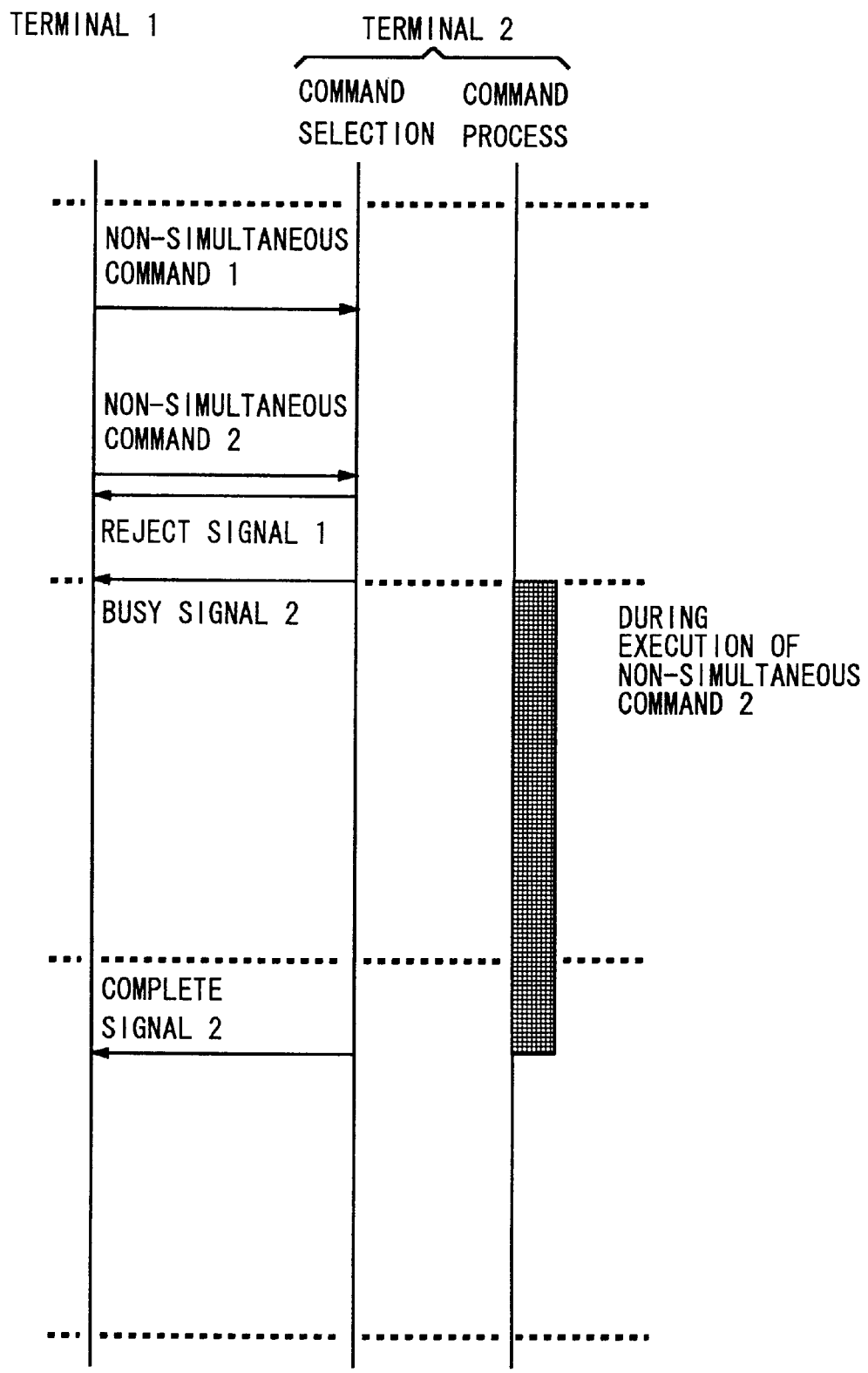
FIG. 3 schematically illustrates command communication in which two non-simultaneous commands are received in the same predetermined period.
Figure 12:
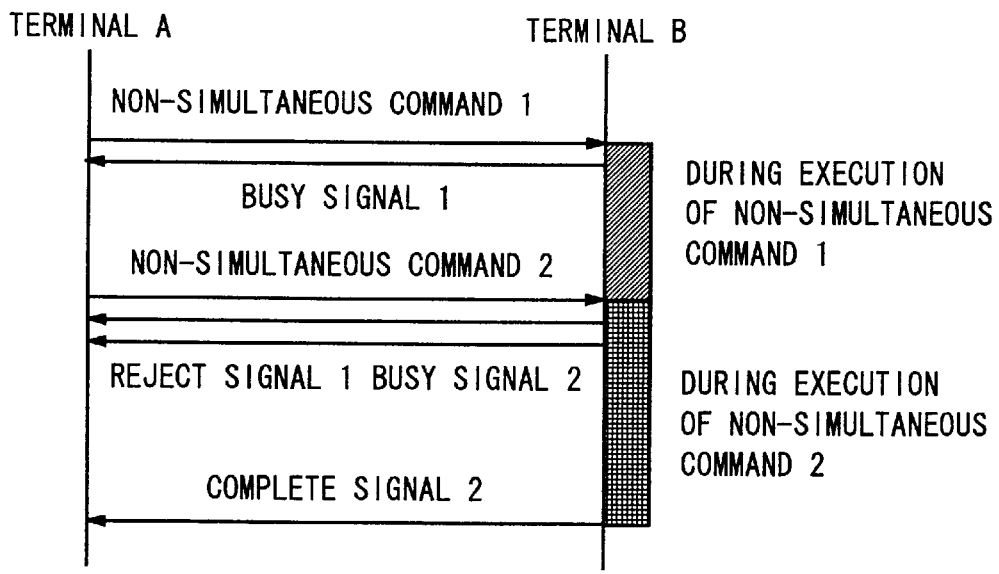
FIG. 12 schematically illustrates a previously proposed method used by a terminal for handling two non-simultaneous commands.

FIG. 3 shows the operation where two non-simultaneous commands are received by terminal 2 within a predetermined period. In this example, terminal 2 receives, within a predetermined period of 17 ms, non-simultaneous command 1 first and then non-simultaneous command 2. This particular embodiment confers the highest priority to the most recently received non-simultaneous command and, therefore, terminal 2 stores in the buffer non-simultaneous command 2. Upon the receipt of non-simultaneous command 2, terminal 2 also transmits reject signal 1, which indicates to terminal 1 that terminal 2 will not execute non-simultaneous command 1. During the next predetermined period, terminal 2 begins executing non-simultaneous command 2 and transmits busy signal 2 to terminal 1. During the third predetermined period, terminal 2 issues a complete signal 2 after the execution of non-simultaneous command 2 has been completed. This signal indicates to terminal 1 that non-simultaneous command 2 has been executed. Unlike the previously proposed method shown in FIG. 12, the method shown in FIG. 3 does not transmit the busy signal 1 because a busy signal in this method is transmitted only with respect to non-simultaneous commands that are expected to be completely executed. In the example of FIG. 3, non-simultaneous command 1 was displaced by non-simultaneous command 2 received during the same predetermined period, which was executed by terminal 2. Therefore, terminal 2 need not transmit the busy signal corresponding to non-simultaneous command 1 because this command was never executed. Consequently, the method of FIG. 3 uses one less packet than the previously proposed method of FIG. 12.

Figure 4:
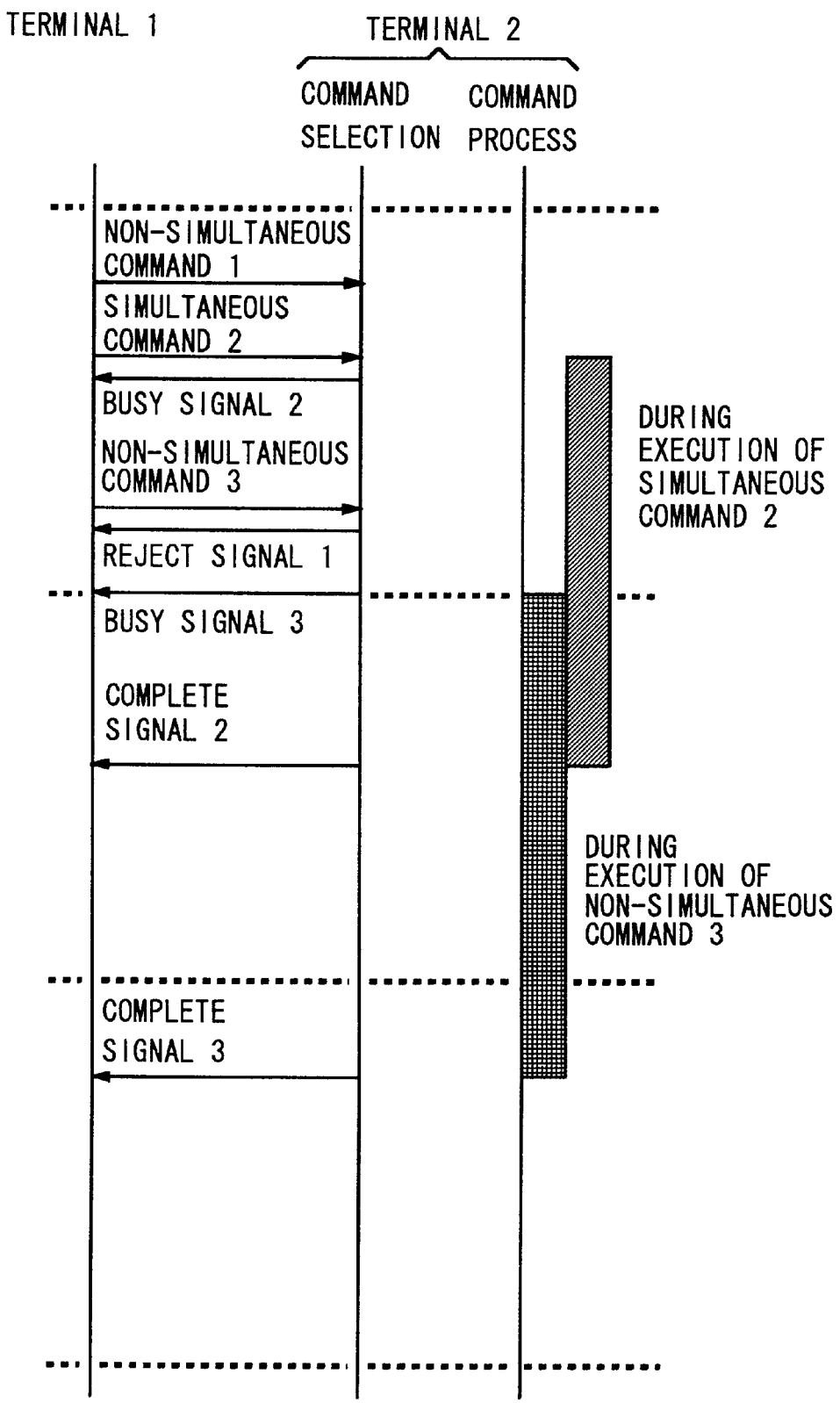
FIG. 4 schematically illustrates command communication in which two non-simultaneous commands and a simultaneous command are received within a predetermined period.
Figure 13:
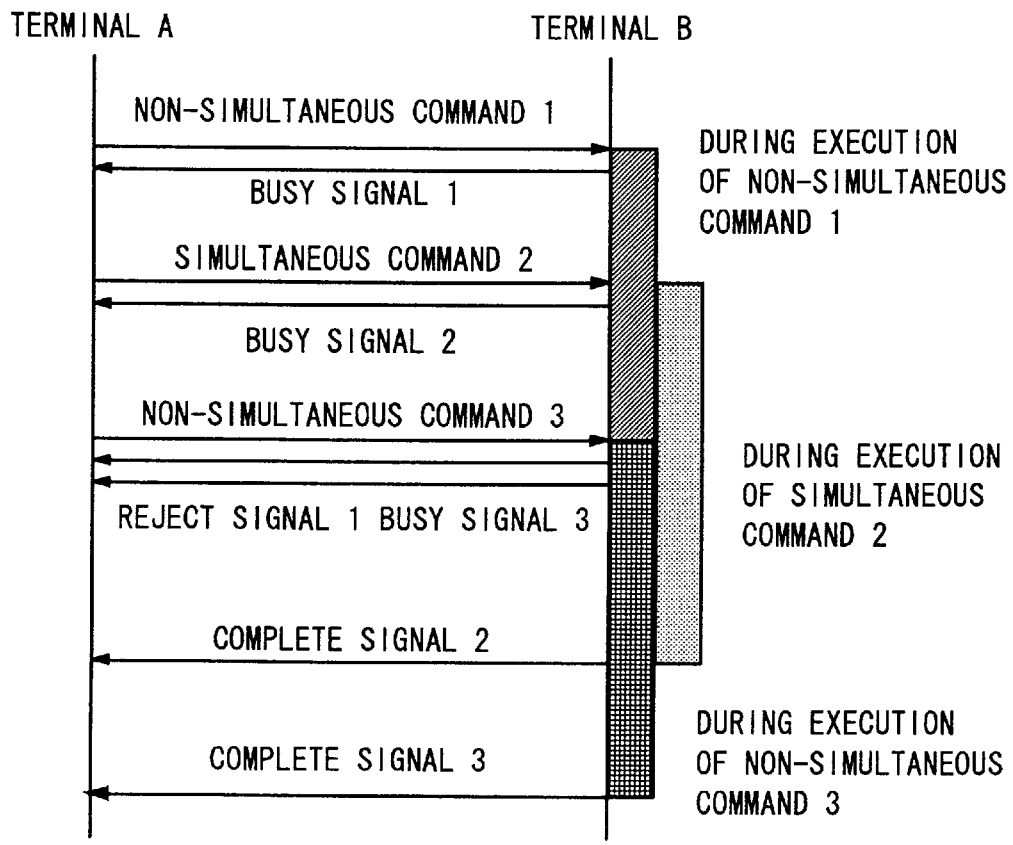
FIG. 13 schematically illustrates a previously proposed method used by a terminal for handling two non-simultaneous commands and a simultaneous command.

FIG. 4 shows the operation where terminal 2 receives non-simultaneous command 1 within one predetermined period. If only one non-simultaneous command is received by terminal 2 within a predetermined period, then terminal 2 executes non-simultaneous command 1. On the other hand, if non-simultaneous command 3 also is received within this predetermined period, then only non-simultaneous command 3 is executed and reject signal 1 is issued with respect to the displaced non-simultaneous signal 1. Also, busy signal 3 is issued when terminal 2 begins executing non-simultaneous command 3 during the next predetermined period. A simultaneous command 2 that is received subsequent to non-simultaneous command 1 is executed independently of any other commands. When terminal 2 receives simultaneous command 2, terminal 2 returns busy signal 2 to terminal 1 and begins executing simultaneous command 2. During period 2, complete signal 2 is issued after the execution of simultaneous command 2 is completed, and during period 3, complete signal 3 issues after the execution of non-simultaneous command 3 is completed. This method reduces the amount of data placed on bus 10 because this method, unlike the previously proposed method shown in FIG. 13, does not require terminal 2 to transmit busy signal 1 since non-simultaneous command 1 was displaced by non-simultaneous command 3.

Figure 5:
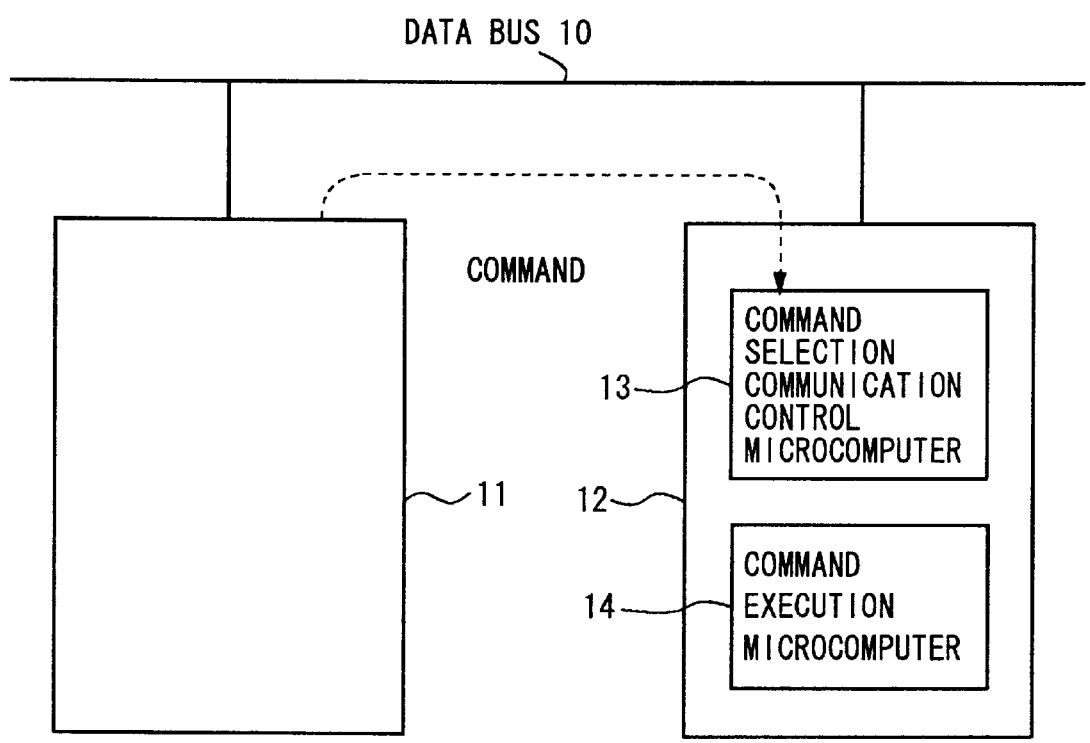
FIG. 5 illustrates the command selection communication control section and the command execution processing section of a terminal of the present invention.

FIG. 5 illustrates a command selection communication control microcomputer 13 and the command execution processing microcomputer 14 of terminal 12, which may comprise a VTR. A command is transmitted from a terminal 11 to VTR 12 and a response is transmitted from the VTR 12 to the terminal 11. The communication between the command selection communication control microcomputer 13 and the command execution processing microcomputer 14 is performed during a predetermined timing period (about 17 msec) in the VTR. When the command selection communication control microcomputer 13 and command execution processing microcomputer 14 do not communicate, as in the case when a plurality of non-simultaneous commands reaches the VTR 12, the command to be actually executed is selected by the command selection communication control microcomputer 13 to be the most recently received non-simultaneous command. This selected command is then supplied at a subsequent communication timing to command execution processing microcomputer 14. In the case of a received simultaneous command, it too is supplied to the command execution processing microcomputer for execution.

Figure 6:
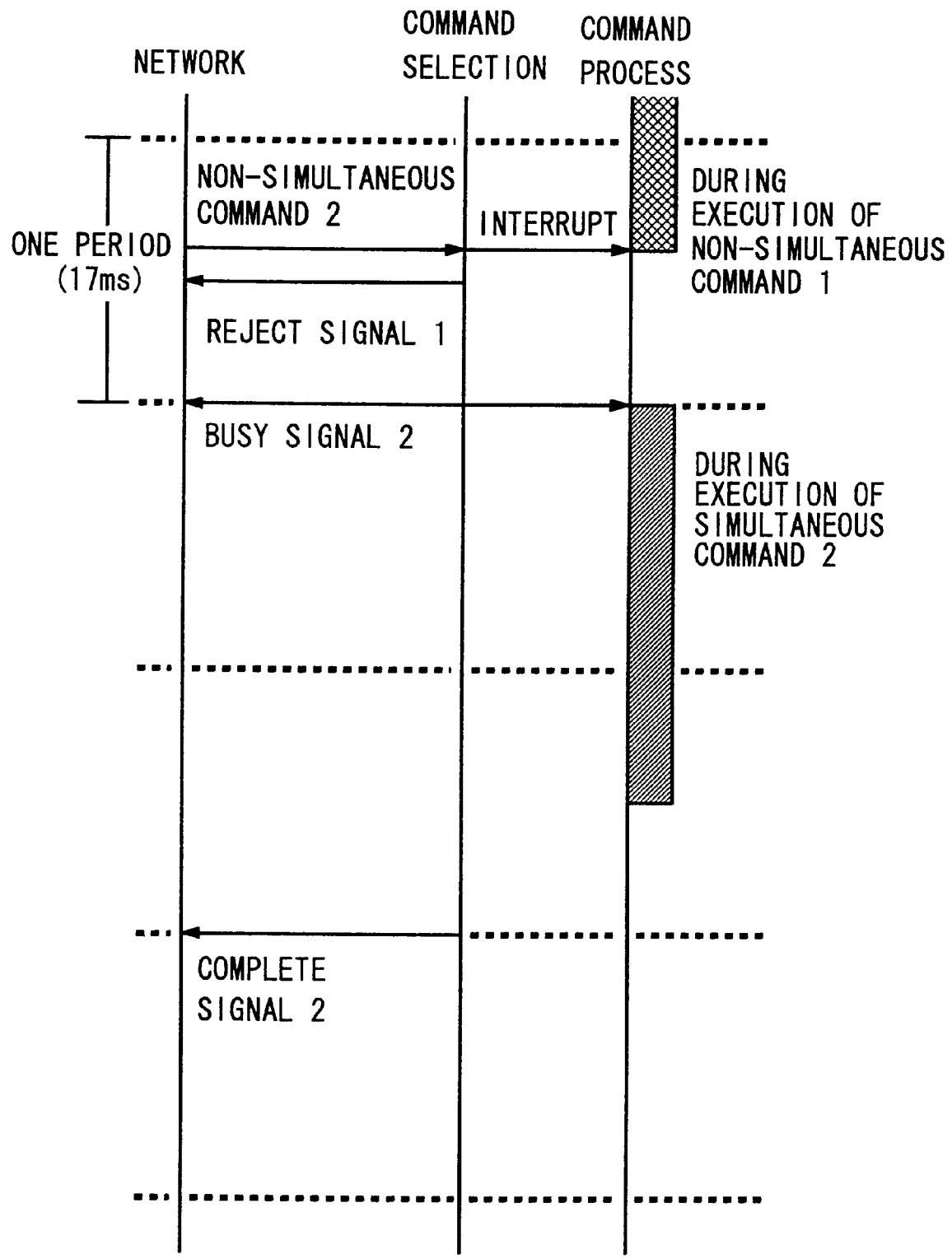
FIG. 6 schematically illustrates command communication in which the execution of a non-simultaneous command is interrupted by the arrival of a subsequent non-simultaneous command.

FIG. 6 illustrates how the execution of one non-simultaneous command is interrupted upon the reception of a subsequent non-simultaneous command. The command selection communication control microcomputer 13 and command execution processing microcomputer 14 perform the transmission and reception of the commands and the responses during the predetermined timing period of the command execution processing microcomputer 14. When a non-simultaneous command 1 is received at VTR 12, it is stored in a buffer. Only one non-simultaneous command can be stored in the buffer at any one time. At the end of the timing period of the command execution processing microcomputer 14, non-simultaneous command 1 is sent to the command execution processing microcomputer 14 and a busy signal corresponding to this command is sent to terminal 11. If non-simultaneous command 2 arrives during the timing period when non-simultaneous command 1 is being executed, the command execution processing microcomputer 14 interrupts the execution of non-simultaneous command 1 and issues a reject signal 1 corresponding to this command. After issuing reject signal 1, the microcomputer 14 executes the non-simultaneous command 2 and issues a busy signal 2. Once this command 2 has been executed, the microcomputer 14 issues a complete signal 2 at the next communication timing period.

Figure 7:
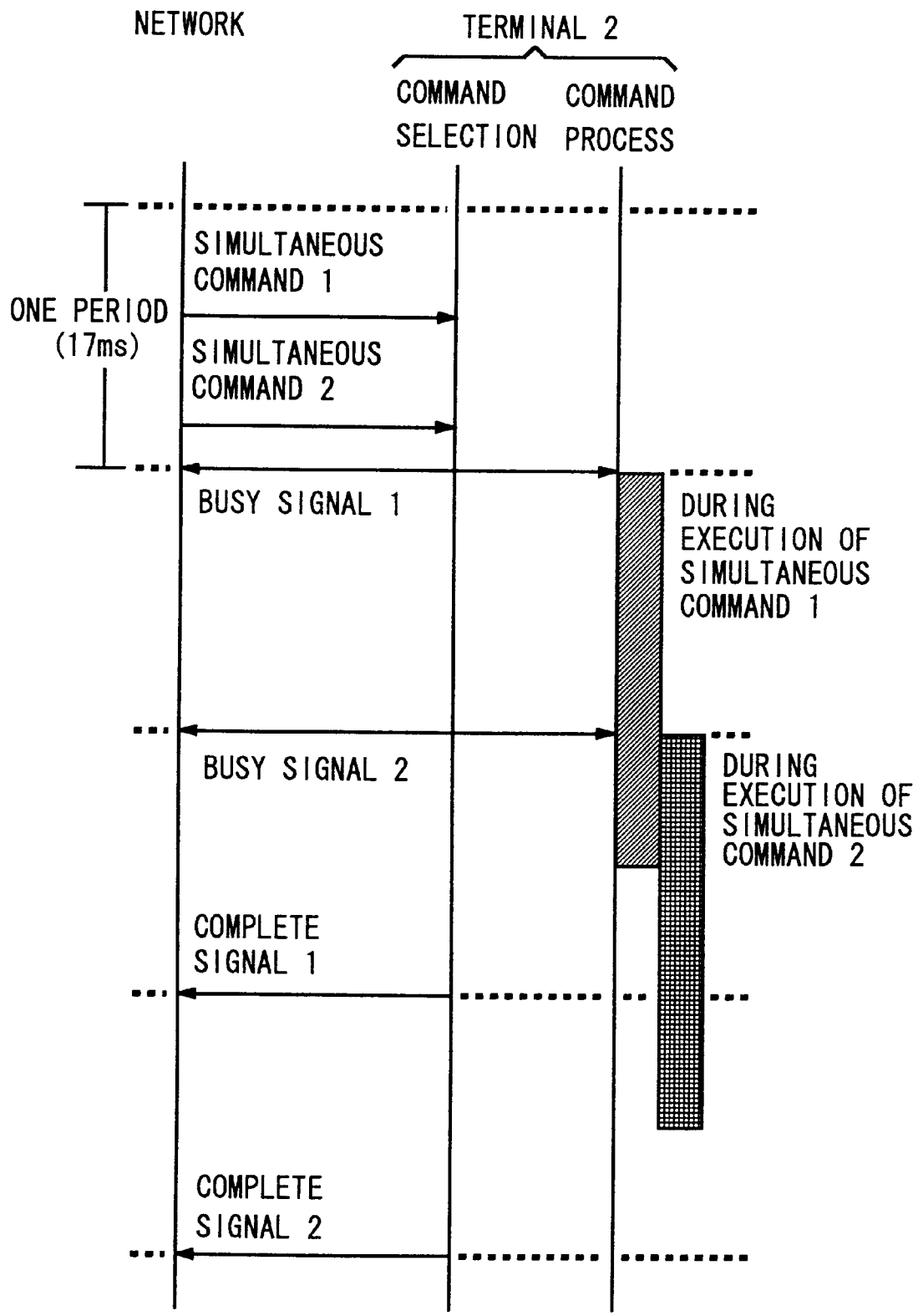
FIG. 7 schematically illustrates command communication in which two simultaneous commands are received in the same predetermined period.

FIG. 7 shows the operation where two simultaneous commands arrive at terminal 1 within a single predetermined period. In this example, simultaneous command 1 is received before simultaneous command 2. In the second period, the execution of simultaneous command 1 begins, and a busy signal 1 is issued. The execution of this command ends in the third period, during which a complete signal 1 is issued when the execution of simultaneous command 1 is concluded. The execution of simultaneous command 2 begins in period 3 and ends in period 4. During period 3, busy signal 2 issues, and during period 4, complete signal 2 issues once the execution of simultaneous command 2 is completed. Unlike non-simultaneous commands, the simultaneous commands of FIG. 7 are executed independently of the communication period of the command selection communication control.

Figure 8:
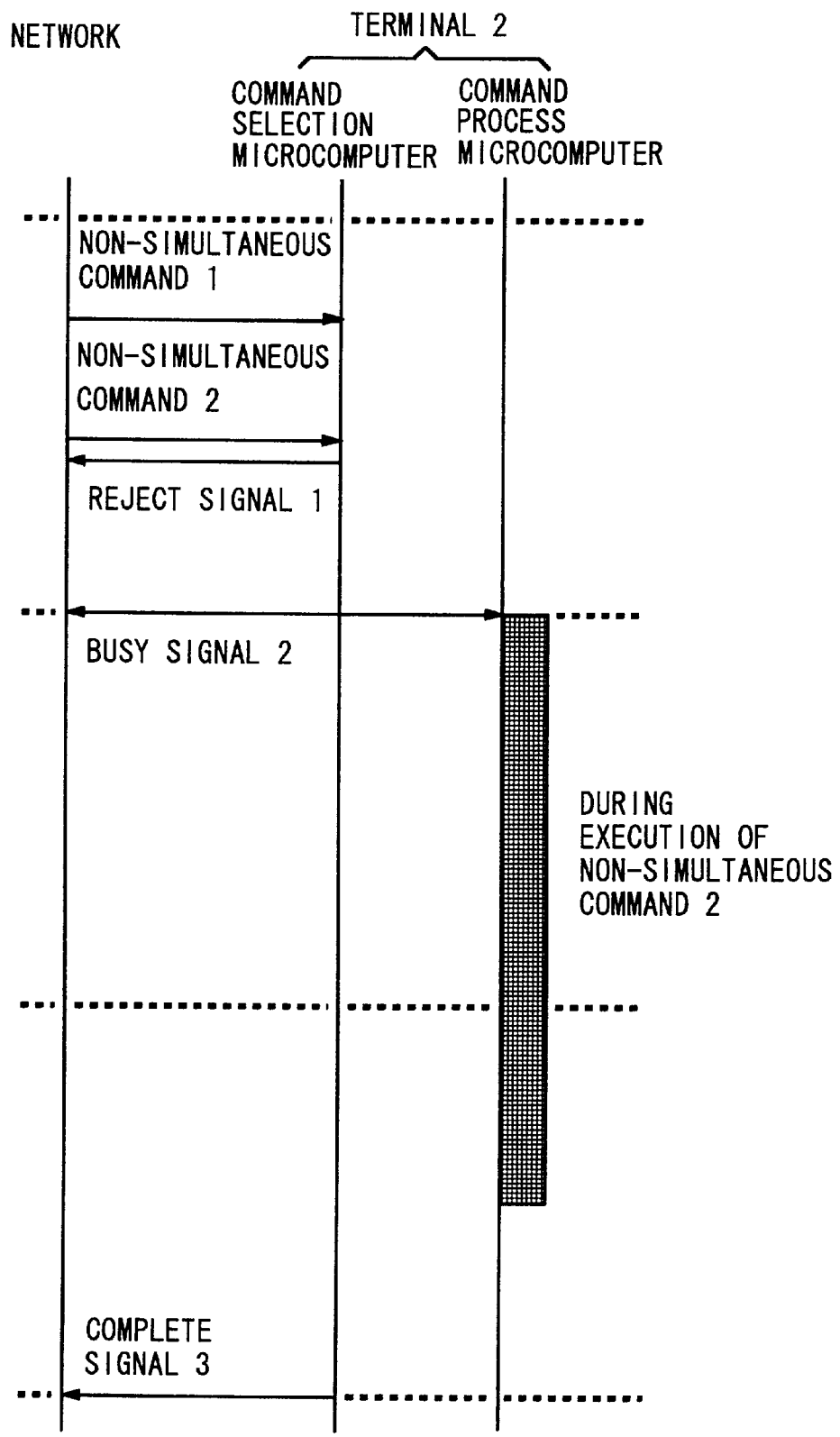
FIG. 8 schematically illustrates command communication in which two non-simultaneous commands are received in the same predetermined period.

In FIG. 8, a non-simultaneous command 1 is received before non-simultaneous command 2 but both are received in the same period. As mentioned before, the receiving terminal of the present invention stores and executes only the most recently received non-simultaneous command. Therefore, in FIG. 8, once non-simultaneous command 2 is received, previously stored non-simultaneous command 1 is deleted from the buffer and a reject signal 1 corresponding to this deleted command is issued. During the next period, the execution of non-simultaneous command 2 begins and busy signal 2 is issued with respect thereto. When the execution of non-simultaneous command 2 is finished during the third period, complete signal 2 is issued. Since non-simultaneous command 1 was never executed, no busy signal is issued with respect thereto. Therefore, this method uses one less packet then the previously proposed method discussed in conjunction with FIGS. 12 and 13.

Figure 9:
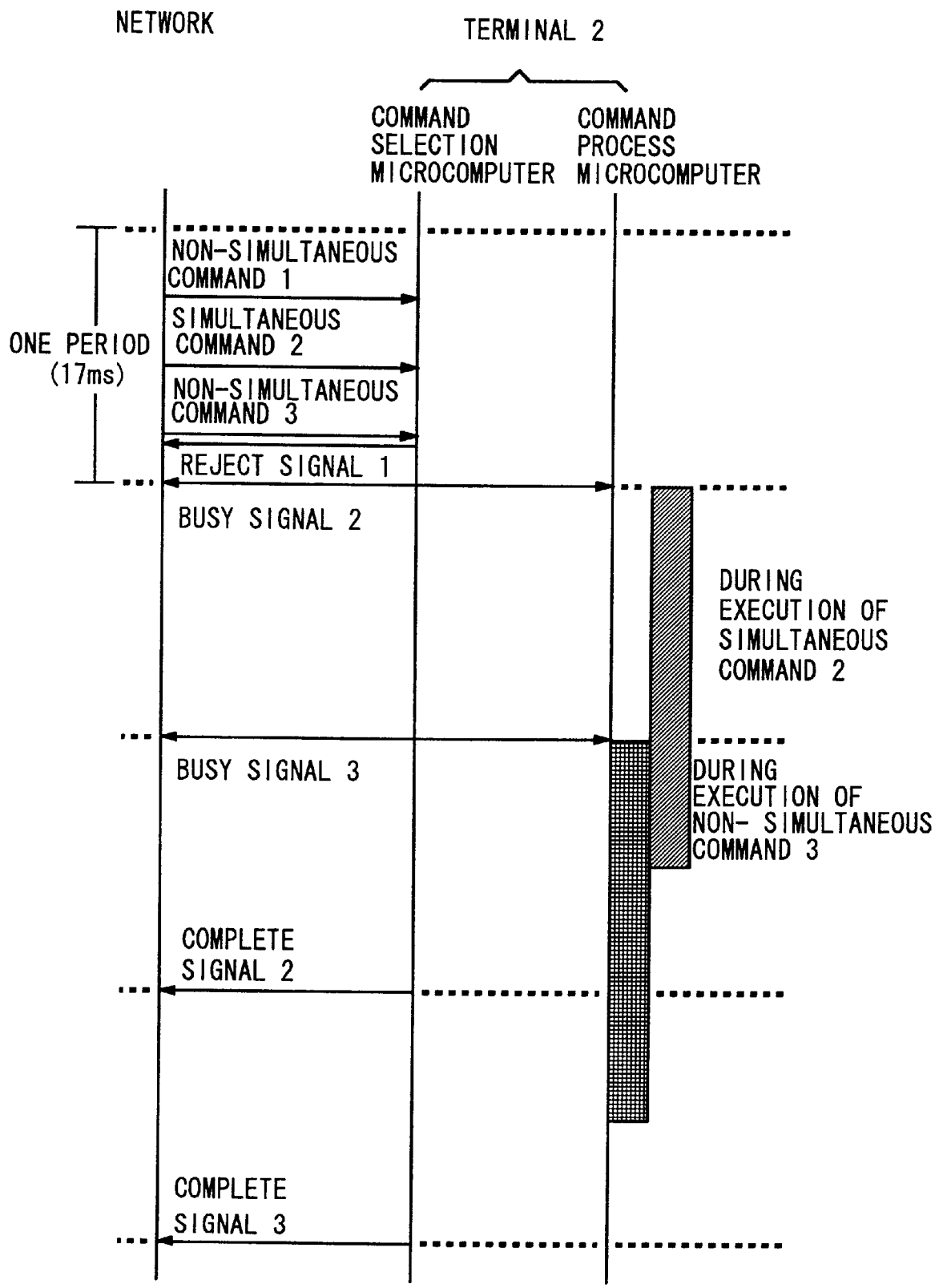
FIG. 9 schematically illustrates command communication in which two non-simultaneous commands and a simultaneous command are received within the same predetermined period.

In FIG. 9, a non-simultaneous command 1 is received before simultaneous command 2 within a predetermined period. After being received by terminal 2, non-simultaneous command 1 is stored in the buffer. However, if non-simultaneous command 3 is received after simultaneous command 2 but before execution of non-simultaneous command 1 begins, then non-simultaneous command 1 is displaced from terminal 2, which issues reject signal 1 in response thereto. During the second period, terminal 2 begins to execute simultaneous command 2 and issues busy signal 2 with respect thereto. When the execution of simultaneous command 2 is completed during the third period, terminal 2 issues complete signal 2 within the same period. As for non-simultaneous command 3, terminal 2 begins executing this command during the third period and finishes this execution during the fourth period, during which a complete signal 3 is issued.

Figure 10:
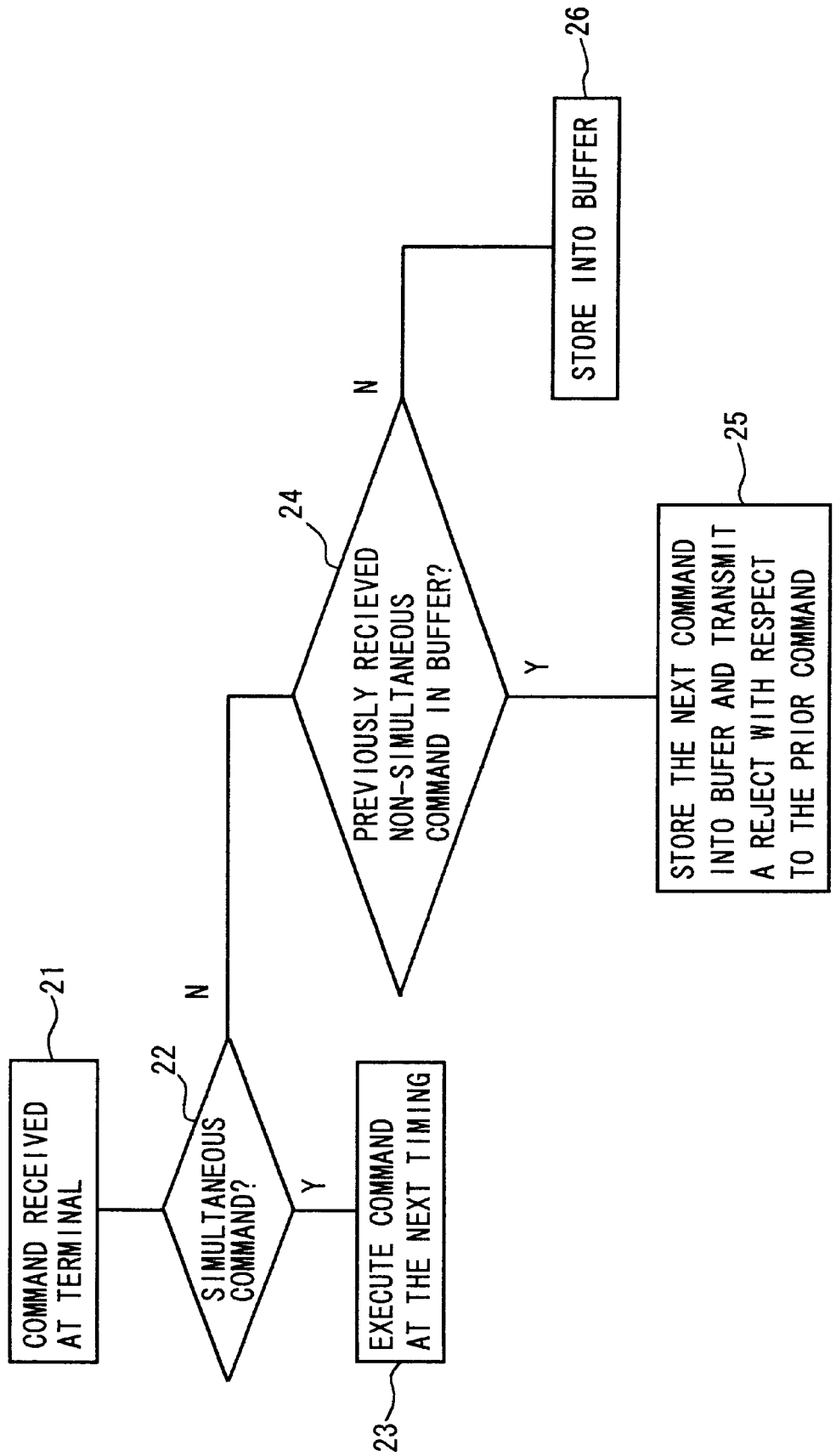
FIG. 10 is a flow chart describing a method of processing a received command.

FIG. 10 is a flowchart that describes how a terminal processes a received command. When a terminal receives a command (step 21), it determines if the command is a simultaneous command or a non-simultaneous command (step 22). If the received command is a simultaneous command, then the terminal executes this command during the next timing period (step 23). If the received command is a non-simultaneous command, then the terminal determines in step 24 whether the buffer already stores a previously received non-simultaneous command. If yes, then the later-received command is stored in place of the earlier command, and the terminal issues a reject signal with respect to the displaced command (step 25). If the buffer does not store any command, then the current non-simultaneous command is stored (step 26).

Figure 11:
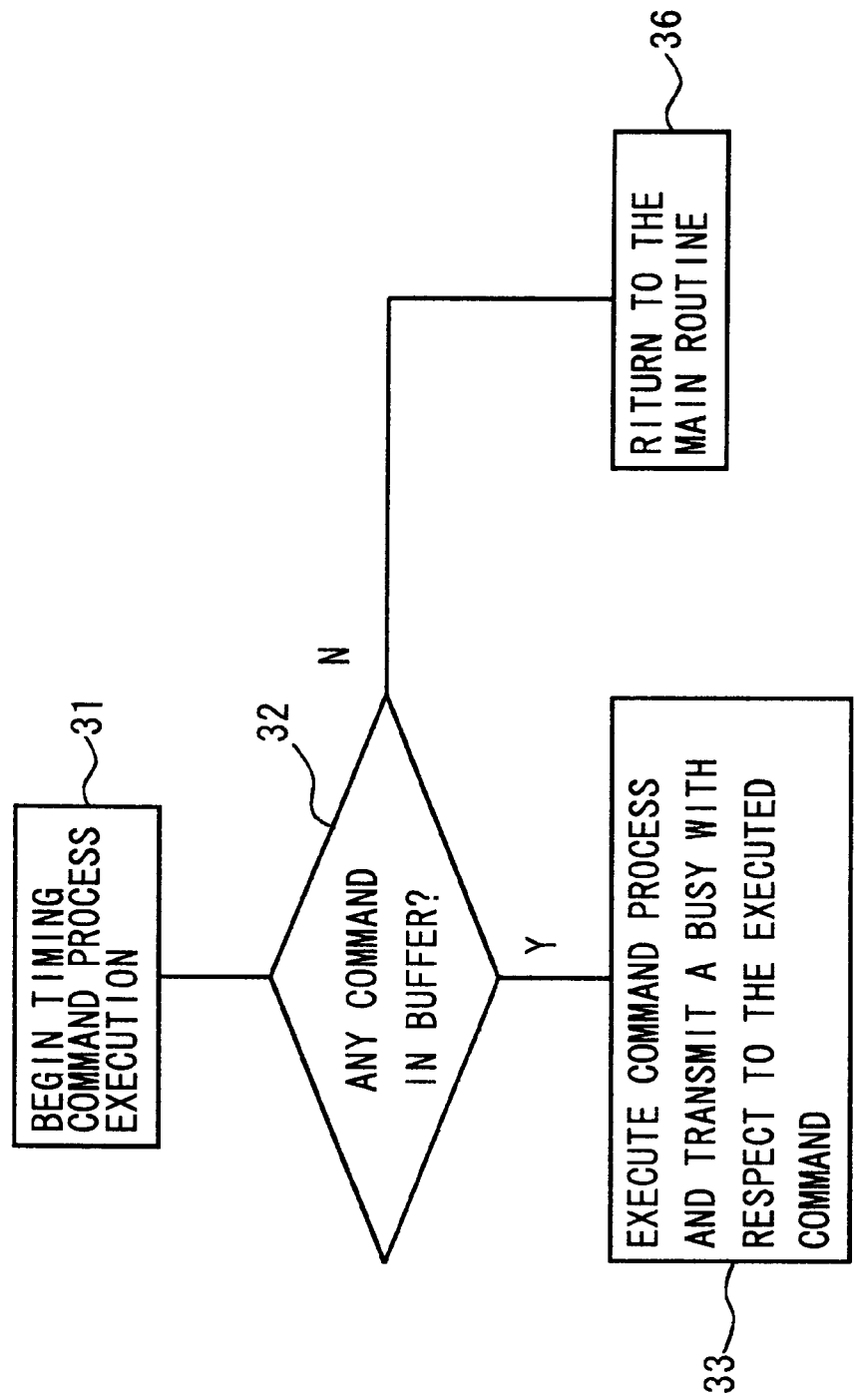
FIG. 11 is a flow chart exhibiting the timing of a command execution processing.

FIG. 11 is a flowchart exhibiting the timing of the command execution processing. In step 31, the timing of a command process execution begins. In step 32, the terminal determines whether any command is stored in the buffer. If yes, then the terminal executes the stored command and issues a busy signal with respect thereto. If the buffer does not contain any signal, then the terminal returns to the main routine (step 32).

The above embodiments have been described with the assumption that the terminals include respective VTRs. If a video display is included in each terminal, however, only one particular channel control and only one particular volume control operation may be selected at any one time. By providing a buffer for the channel command and a buffer for the volume command, therefore, the video display can operate in a manner similar to that of the VTR in the above embodiments. For instance, when a command to increase the channel is received in the same period as a command to decrease the channel, it is self-evident that these two inconsistent commands cannot be executed simultaneously. In this instance, these commands are arranged in accordance with a predetermined priority. For example, the terminal may be programmed to execute the most recent or least recent command. This priority of commands may also be used with respect to a command to increase the volume and a command to reduce the volume. In addition to the video display, the invention also is applicable generally to an apparatus having an operating state (a channel, a volume, or the like) that is uniquely decided.

While the present invention has been particularly shown and described with reference to preferred embodiments, it will be readily appreciated by those of ordinary skill in the art that various changes and modifications may be made without departing from the spirit and scope of the invention.

It is intended that the appended claims be interpreted as covering the specific embodiments described herein, those modifications and alternatives which have been mentioned above, and all equivalents thereto.

We claim:

1. A terminal apparatus comprising:
    means for receiving at least one simultaneous command or at least one non-simultaneous command;
    means for selecting one of said received non-simultaneous commands;
    means for executing said selected non-simultaneous command; and
    means for generating an acknowledgement signal which acknowledges that said selected non-simultaneous command is being executed and for outputting the acknowledgement signal therefrom when said selected non-simultaneous command is being executed and for not generating and outputting an acknowledgement signal for a non-simultaneous command which has been received and not selected.

2. A terminal apparatus according to claim 1, wherein said selecting means selects one of said non-simultaneous commands which are received during a predetermined timing period.

3. A terminal apparatus comprising:
    means for receiving at least one simultaneous command or at least one non-simultaneous command:
    means for selecting one of said received non-simultaneous commands;
    means for executing said selected non-simultaneous command; and
    means for generating a signal which acknowledges that said selected non-simultaneous command is being executed and for outputting the acknowledgement signal therefrom when said selected non-simultaneous command is being executed,
    wherein said selecting means comprises means for selecting the most recently received non-simultaneous command signal.

4. A method of controlling communication among a plurality of terminals in a network, said method comprising the steps of:
    receiving at a terminal at least one simultaneous command or at least one non-simultaneous command;
    selecting one of said received non-simultaneous commands;
    executing said selected non-simultaneous command; and
    generating an acknowledgement signal which acknowledges that said selected non-simultaneous command is being executed and outputting the acknowledgement signal therefrom when said selected non-simultaneous command is being executed and not generating and outputting an acknowledgement signal for a non-simultaneous command which has been received and not selected.

5. A method according to claim 4, wherein the selecting step selects one of said non-simultaneous commands which are received during a predetermined timing period.

6. A terminal apparatus comprising:
    means for receiving at least one simultaneous command or at least one non-simultaneous command;
    means for selecting one of said received non-simultaneous commands;
    means for executing said selected non-simultaneous command; and
    means for generating a signal which acknowledges that said selected non-simultaneous command is being executed and for outputting the acknowledgement signal therefrom when said selected non-simultaneous command is being executed; and
    means for generating and outputting a reject signal corresponding to a non-selected non-simultaneous command that has been received.

7. A terminal apparatus according to claim 6, wherein said reject signal is generated and outputted immediately after said select means selects one of said non-simultaneous commands.

8. A terminal apparatus comprising:
    means for receiving at least one simultaneous command or at least one non-simultaneous command;
    means for selecting one of said received non-simultaneous commands;
    means for executing said selected non-simultaneous command; and
    means for generating a signal which acknowledges that said selected non-simultaneous command is being executed and for outputting the acknowledgement signal therefrom when said selected non-simultaneous command is being executed, wherein said selecting means selects one of said non-simultaneous commands which are received during a predetermined timing period, and wherein said selected non-simultaneous command is being executed at a next-following timing period.

9. A terminal apparatus according to claim 8, wherein said acknowledgement signal is generated at a start timing of said next-following timing period.

10. A method of controlling communication among a plurality of terminals in a network, said method comprising the steps of:

receiving at a terminal at least one simultaneous command or at least one non-simultaneous command;

selecting one of said received non-simultaneous commands;

executing said selected non-simultaneous command; and generating a signal which acknowledges that said selected non-simultaneous command is being executed and outputting the acknowledgement signal therefrom when said selected non-simultaneous command is being executed, wherein the selecting step selects one of the most recently received non-simultaneous command and the first received non-simultaneous command.

11. A method of controlling communication among a plurality of terminals in a network, said method comprising the steps of:

receiving at a terminal at least one simultaneous command or at least one non-simultaneous command;

selecting one of said received non-simultaneous commands;

executing said selected non-simultaneous command;

generating a signal which acknowledges that said selected non-simultaneous command is being executed and outputting the acknowledgement signal therefrom when said selected non-simultaneous command is being executed; and generating and outputting a reject signal corresponding to a non-selected non-simultaneous command that has been received.

12. A method according to claim 11, wherein said reject signal is generated and outputted immediately after one of said non-simultaneous commands is selected.

13. A method of controlling communication among a plurality of terminals in a network, said method comprising the steps of:

receiving at a terminal at least one simultaneous command or at least one non-simultaneous command;

selecting one of said received non-simultaneous commands;

executing said selected non-simultaneous command; and generating a signal which acknowledges that said selected non-simultaneous command is being executed and outputting the acknowledgement signal therefrom when said selected non-simultaneous command is being executed, wherein the selecting step selects one of said non-simultaneous commands which are received during a predetermined timing period, and wherein said selected non-simultaneous command is being executed at a next-following timing period.

14. A method according to claim 13, wherein said acknowledgement signal is generated at a start timing of said next following period.

* * * * *